United States Patent
Mathur et al.

(10) Patent No.: US 9,544,275 B2
(45) Date of Patent: Jan. 10, 2017

(54) COMMUNICATION TUNNELING IN APPLICATION CONTAINER ENVIRONMENTS

(71) Applicant: defend7, Inc., Mountain View, CA (US)

(72) Inventors: Gaurav Mathur, Palo Alto, CA (US); Vibhav Sreekanti, Pleasanton, CA (US)

(73) Assignee: defend7, Inc., Mountain View, CA (US)

( * ) Notice: Subject to any disclaimer, the term of this patent is extended or adjusted under 35 U.S.C. 154(b) by 0 days.

(21) Appl. No.: 14/607,738

(22) Filed: Jan. 28, 2015

(65) Prior Publication Data

US 2016/0219019 A1    Jul. 28, 2016

(51) Int. Cl.
G06F 15/16   (2006.01)
H04L 29/06   (2006.01)
H04L 29/12   (2006.01)

(52) U.S. Cl.
CPC ......... *H04L 63/0272* (2013.01); *H04L 63/029* (2013.01); *H04L 61/6022* (2013.01); *H04L 63/02* (2013.01); *H04L 63/0478* (2013.01)

(58) Field of Classification Search
CPC .... H04L 63/0272; H04L 63/029; H04L 63/02; H04L 63/00; H04L 9/00; H04L 29/06625; H04L 61/6022; H04L 63/0478; H04L 63/16; H04N 21/4367
See application file for complete search history.

(56) References Cited

U.S. PATENT DOCUMENTS

| 5,898,830 | A * | 4/1999 | Wesinger, Jr. | B65B 11/004 709/225 |
| 6,225,993 | B1 * | 5/2001 | Lindblad | G06F 17/30896 348/E7.071 |
| 8,464,336 | B2 * | 6/2013 | Wei | H04L 12/4633 370/328 |
| 8,976,798 | B2 * | 3/2015 | Border | H04L 12/4641 370/394 |
| 2014/0109174 | A1 * | 4/2014 | Barton | H04W 12/08 726/1 |
| 2014/0109175 | A1 * | 4/2014 | Barton | H04L 63/0807 726/1 |
| 2014/0150083 | A1 * | 5/2014 | Dinha | H04L 63/0272 726/15 |

* cited by examiner

*Primary Examiner* — Krisna Lim (57) ABSTRACT

Systems, methods, and software described herein provide encryption configurations to application containers. In one example, a method of operating a management system to provide VPN configurations to application containers in an application container environment includes identifying two application containers in the application container environment for secure communication, and identifying a VPN configuration for the two application containers. The method further includes configuring the two application containers for secure communication by transferring the VPN configuration to security layers within each of the two application containers.

18 Claims, 7 Drawing Sheets

COMMUNICATION TUNNELING IN APPLICATION CONTAINER ENVIRONMENTS

TECHNICAL FIELD

Aspects of the disclosure are related to computing security and in particular to providing virtual private networks to application containers.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes physical and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, in some security implementations, a virtual private network (VPN) may be provided between two communicating systems. A VPN extends a private network across a public network, such as the internet, and enables a computer to send and receive data across shared or public networks as if it is directly connected to the private network. The advantages to a VPN are many and include, adding additional security as if the connecting devices were connected across a private network, advanced management allowing an administrator or other management service to control the data and systems that connect to the VPN, amongst a variety of other benefits.

In addition to the protective measures discussed above, segregation methods have also been pursued to limit the interaction between systems and applications. These segregation methods include whole system virtualization, which includes a full operating system and one or more applications, as well as application containers that are used to reduce dependencies on other cooperating applications. However, separating the applications into different virtual machines or application containers can add complexity to the security configurations for each of the executing applications.

OVERVIEW

Provided herein are systems, methods, and software to provide virtual private network (VPN) configurations to application containers. In one example, a method of operating a management system to provide VPN configurations to application containers in an application container environment includes identifying a first application container and a second application container in the application container environment for secure communication, and identifying a VPN configuration for the first application container and the second application container. The method further includes configuring the first application container and the second application container for secure communication by transferring the VPN configuration to a first security layer within the first application container and a second security layer within the second application container, wherein the first security layer acts as a communication intermediary between at least one application within the first application container and at least one process or system external to the first application container, and wherein the second security layer acts as a communication intermediary between at least one application within the second application container and at least one process or system external to the second application container.

In another instance, a computer apparatus to provide VPN configurations to application containers includes processing instructions that direct a management system to identify a first application container and a second application container in the application container environment for secure communication, and identify a VPN configuration for the first application container and the second application container. The processing instructions further direct the management system to configure the first application container and the second application container for secure communication by transferring the VPN configuration to a first security layer within the first application container and a second security layer within the second application container, wherein the first security layer acts as a communication intermediary between at least one application within the first application container and at least one process or system external to the first application container, and wherein the second security layer acts as a communication intermediary between at least one application within the second application container and at least one process or system external to the second application container. The computer apparatus further includes one or more non-transitory computer readable media that store the processing instructions.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Internet services rely extensively on security to prevent unpermitted processes and users from accessing sensitive data. Such data may include usernames, passwords, social security numbers, and credit card numbers, amongst other sensitive data. To prevent the unpermitted access, firewalls, antiviruses, and other security processes may be executed on the devices hosting the internet services. These security processes are designed to prevent improper access, or mitigate the effects once a breach has occurred.

In some examples, multiple applications may be necessary to provide specific services to end user devices, such as front-end applications, back-end applications, data service applications, or any other application. Each of these applications are responsible for a particular task, such as taking in and storing data, processing data that is received, organizing data received, or any other task necessary for the service. These applications may be implemented on one or more computing devices configured by an administrator to perform the associated service.

In the present example, application containers are provided to segregate and help secure the data as it is used within the service. These application containers, which operate on a host system, can package an application and its dependencies in a virtual container, and run the containerized applications as an isolated process in userspace on the host operating system. An application container may comprise a Linux container, a jail, a partition, or other type of containment module, but may also comprise a virtual machine in some examples. Accordingly, because the application does not contain any dependencies from other applications or files, the application is essentially segregated from other applications and processes executing on the same computing system.

Here, in addition to the application, the container also includes a security layer to act as a barrier or intermediary between the application and other processes or data systems outside of the application container. This security layer may include encryption, firewall, storage interface, and communication interface modules that can be configured based on the application within the container. Further, the security layer may include a virtual private network (VPN) module that is capable of configuring VPN communications between the application container and one or more external containers and systems.

To provide the VPN configuration, a management system may be included within an application container environment. This management system may provide the application with a variety of security configuration information including VPN configurations for the security layer within the application container. In some examples, the security configuration and VPN configuration may be included with the application container when the application container is generated. However, in other instances, the VPN configuration may be assigned to the application container when the application container is initiated on a host computing system. For example, a front-end server application container that takes in and distributes data from one or more users may be initiated within an environment with a database server application container that stores the data from the one or more end users. As a result, an administrator or some other management service may prefer to configure a VPN between the two application containers to ensure that data is communicated securely between the two containers. Once a VPN is defined, the configuration may then be transferred to the application containers for implementation.

In some examples, the applications within the VPN communicating applications may not identify that a VPN is used in the communication. For instance, an application in the first application container may initiate a transfer of data to a second application in the second application container. Before the data is communicated, a security layer in the first application container may identify the data communication, convert the communication to the desired VPN format, and transfer the data to the second application container. Similarly, the second application container may identify the communication, convert the data from the VPN format, and provide the data to the second application. Thus, neither the first application nor the second application may identify that a VPN was used in the communication between the two applications.

Figure 1:
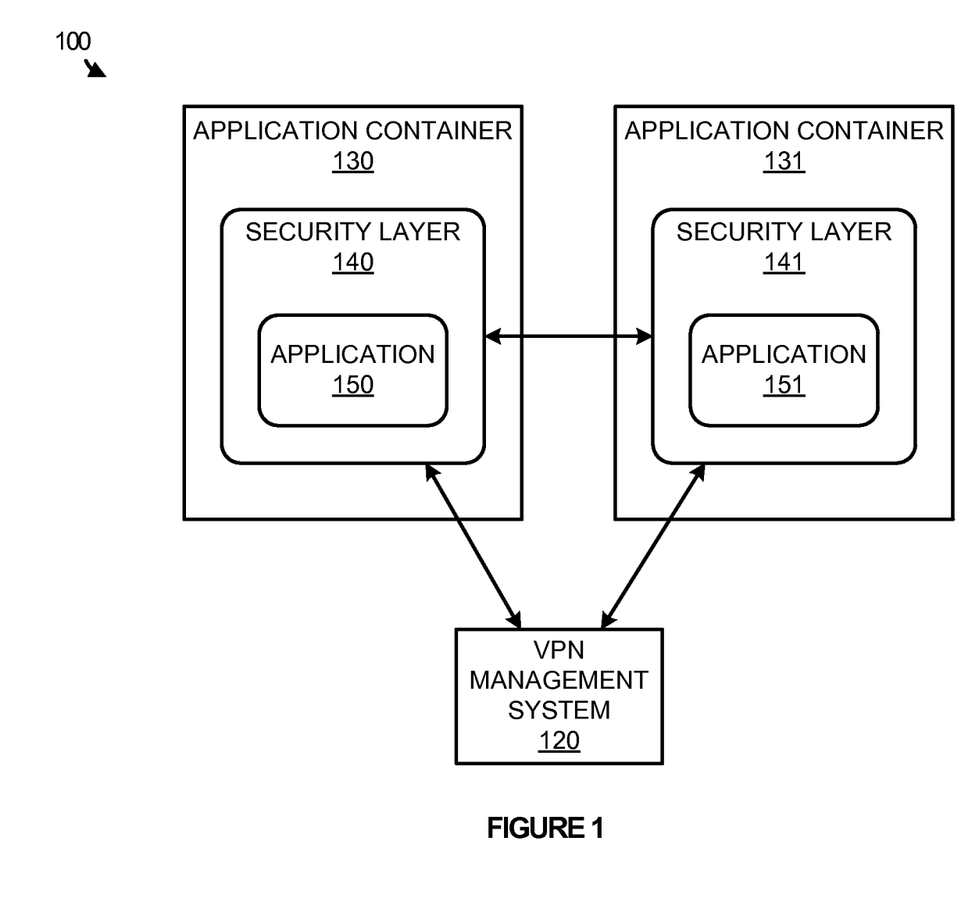
FIG. 1 illustrates an application container environment for configuring and executing secure application containers.

Referring now to FIG. 1, FIG. 1 illustrates an application container environment 100 for configuring and executing secure application containers. Application container environment 100 includes application containers 130-131 and VPN management system 120. Application containers 130-131 further include security layers 140-141 and applications 150-151.

In operation, application containers 130-131 are generated to provide a segregated environment for applications 150-151. These application containers, which operate on a host system, package the components for applications 150-151 and their dependencies within a virtual container, and run the containerized applications as an isolated process in userspace on the host operating system. As illustrated in FIG. 1, each of applications containers 130-131 includes a security layer that acts as an intermediary for data communications between applications 150-151 and processes or systems external to application containers 130-131. Accordingly, if a data communication is received by one of application containers 130-131, the security layer may first transparently filter the communication before being provided to the corresponding application.

As depicted in environment 100, each of application containers 130-131 communicates with VPN management system 120. VPN management system 120 is configured to identify that a secure connection is needed between two application containers, and provide a VPN configuration to the application containers. In some examples, VPN management system 120 configures the application containers when they are provisioned. Accordingly, when the container is initiated on a host system, the container may be preconfigured to communicate using a VPN with another application container. In other instances, rather than provisioning the application container with the VPN configuration, the VPN configuration may be dynamically assessed when the container is initiated within a containerized environment.

Figure 2:
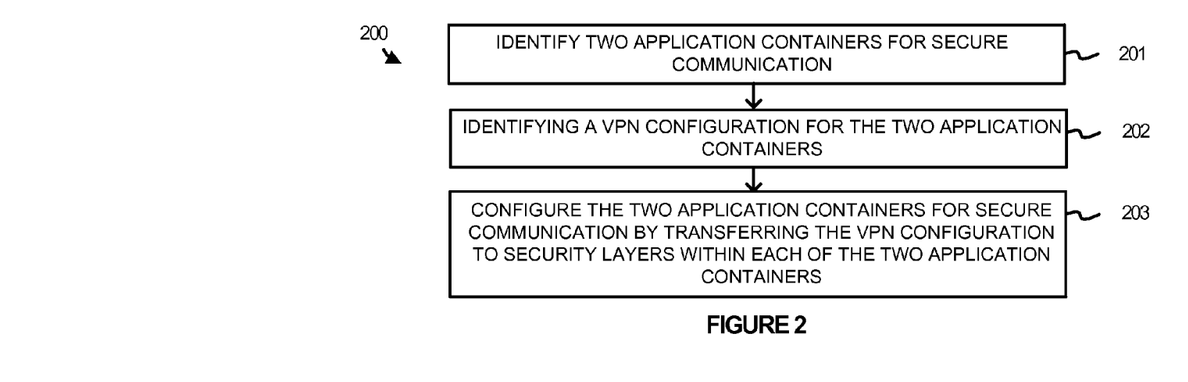
FIG. 2 illustrates a method of operating a management system to provide VPN configurations to application containers in an application container environment.

To further demonstrate the configuration of security layers in application containers, FIG. 2 is provided. FIG. 2 illustrates a method 200 of operating a management system, such as VPN management system 120, to provide VPN configurations to application containers in an application container environment. Initially, the management system identifies two application containers in an application container environment for secure communications (201). Once the application containers are identified, the method further identifies a VPN configuration for the two application containers (202). This VPN configuration information may include authentication information, encapsulation or tunneling formatting information, amongst other VPN information. Once the VPN configuration is determined for the application containers, the method configures the two application containers for secure communication by transferring the VPN configuration to security layers within each of the two application containers (203).

As illustrated in FIG. 1, security layers 140-141 are used to act as an intermediary for communications between applications 150-151 and processes or systems external to application containers 130-131. As a result, in some examples, VPN management system 120 may configure application container 130 to communicate with application container 131 using an identified VPN configuration. However, in situations where the security of the data is less important, no VPN configuration may be passed to the application container. Accordingly, rather than using a VPN configuration or tunneling to pass data between the two containers, the containers may address data to one another using the public Internet Protocol (IP) address assigned to the container.

Further, it should be understood that each application container might have a plurality of VPNs provided for tunneling data between multiple application containers. Thus, as an example, application container 130 may have a first VPN configuration for data communications with application container 131, but may have an entirely separate VPN configuration for communications with another application container or system.

In some examples, the VPN configuration that is provided for the application containers is transparent to the applications executing within the application containers. For example, the applications within the container may identify the application at the opposite end of the communication, but will not identify that a VPN is used to connect the two applications. Accordingly, when data is communicated from a first application within a first application container to a second application in a second application container, a first security layer in the first application container may identify the communication, transparently convert the communication to a VPN format, and transfer the communication to a second application container using the VPN. Similarly, a security layer in the second application container may remove the data from the VPN format and provide the data to the second application as if the VPN were not used in the communication from the first application to the second application.

Figure 3:
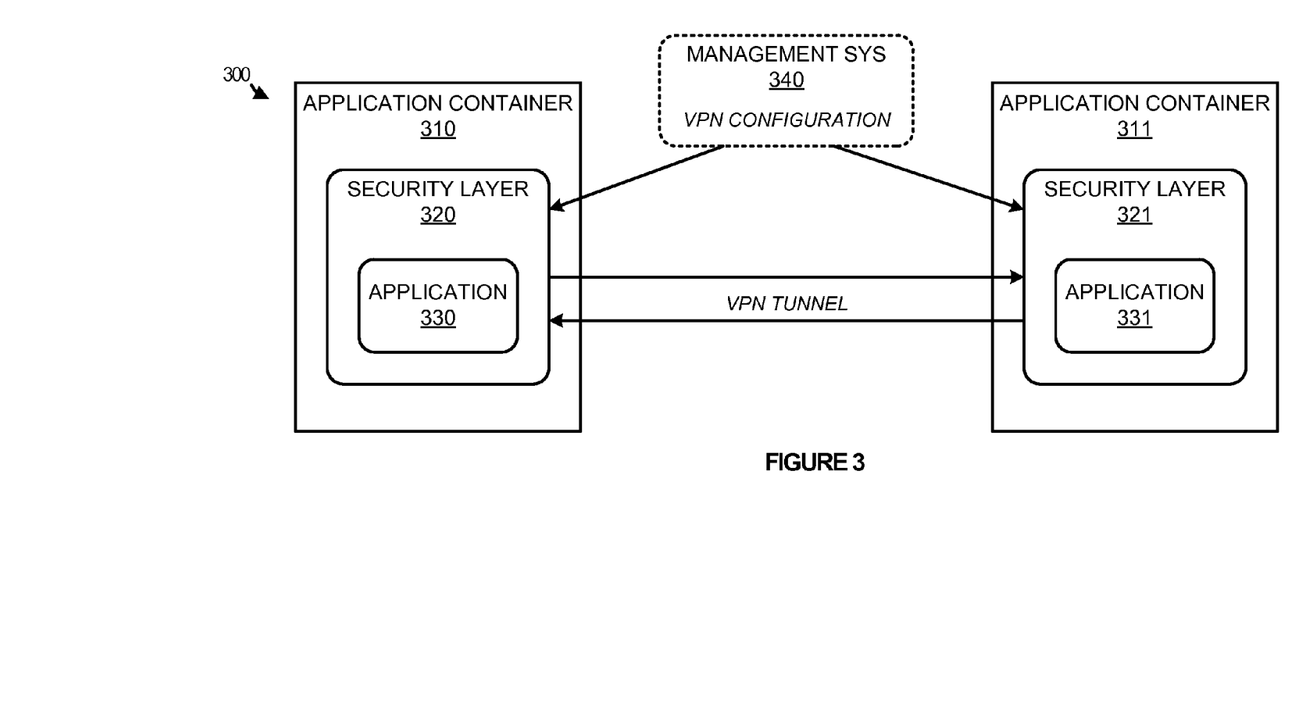
FIG. 3 illustrates an overview of providing a VPN configuration to application containers.

Turning to FIG. 3, FIG. 3 illustrates an overview 300 of providing a VPN configuration to application containers according to one example. Overview 300 includes application containers 310-311, and management system 340, which is an example of VPN management systems 120. Application containers 310-311 further include security layers 320-321 and applications 330-331.

In operation, application containers 310-311 may be deployed within an application container environment to perform specific tasks within the environment. For example, application container 310 may comprise a front-end server application container, whereas application container 311 may comprise a database application container. As a result of the configuration within the containerized environment, application containers 310-311 may require a VPN configuration to provide secure communications between the application containers. As provided in FIG. 3, management system 340 is used to provide the VPN configuration to application containers 310-311. In particular, management system 340 is configured identify that the two containers require a secure communication path, and responsively, transfer a VPN configuration to each of the containers to allow the containers to communicate via a VPN tunnel. This VPN configuration may include authentication information for the containers in the VPN, tunneling format information for the VPN, amongst other possible VPN configuration information.

In some examples, management system 340 may identify the application containers via an administrator that, using a user interface, indicates the application containers that require the secure communication path. In other instances, management system 340 may base the VPN configuration on the applications within the application containers, or the type of data that is being communicated between each of the application containers. For example, application containers that transfer sensitive information, such as social security or credit card, numbers may need a secure communication link to prevent improper access to the data. Accordingly, management system 340 may identify the needs of the application containers and provide the application containers with a VPN configuration based on the requisite needs.

Once application containers 310-311 are configured with the VPN, any data that is to be transferred between the two containers is sent over the VPN to maintain the security of the information. As a result, security layers 320-321 may not identify the data that is being transmitted between the application containers, but rather is concerned about the source and destination for the data. Consequently, although some data communicated between application containers 310-311 may not need to be secured, all the data that is passed between the containers may be transferred using the VPN tunnel.

Figure 4:
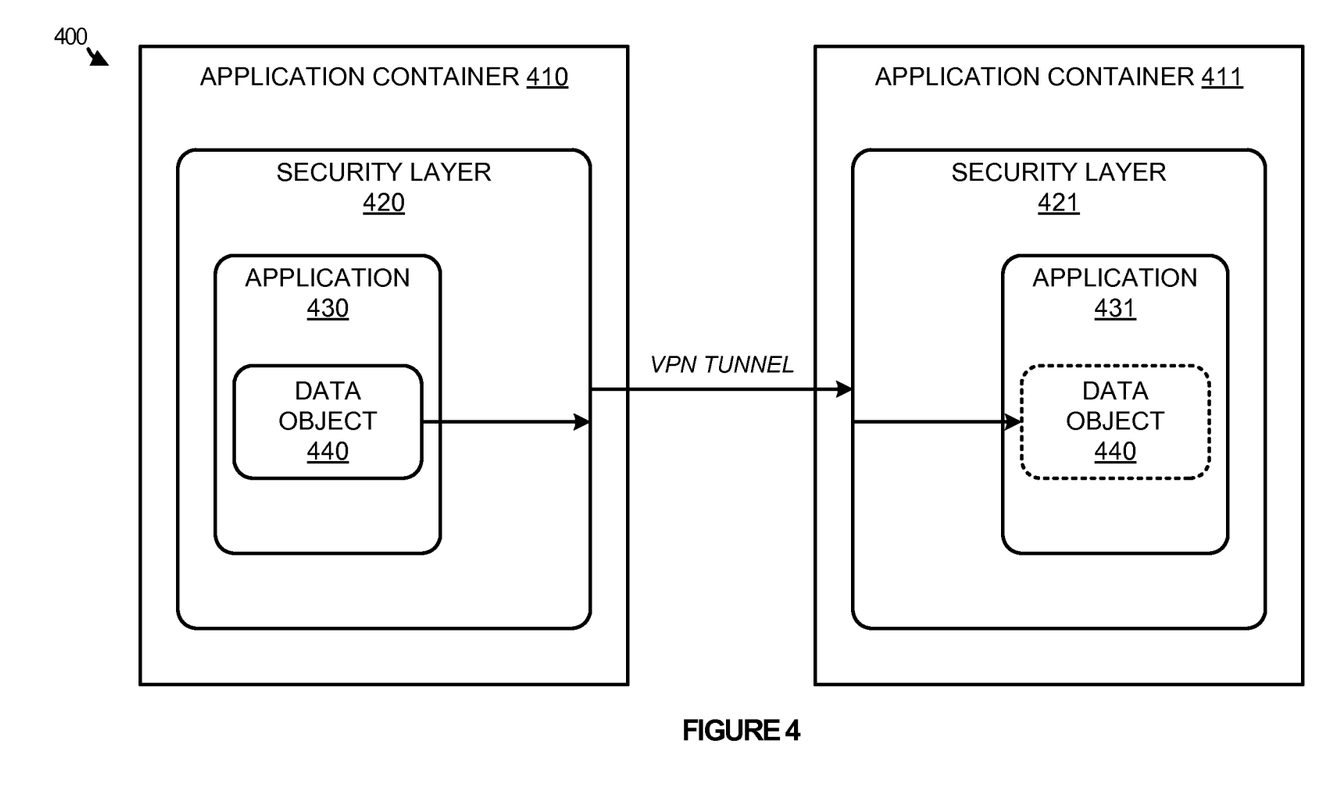
FIG. 4 illustrates an overview of communicating a data object between application containers in an application container environment.

To further demonstrate the VPN tunneling between application containers, FIG. 4 is provided. FIG. 4 illustrates an overview 400 of communicating a data object between application containers in an application container environment, according to one example. Overview 400 includes application containers 410-411, which further include security layers 420-421, and applications 430-431.

As described in FIG. 1-3, a management system may be used to provide the application containers with VPN configurations based on the security requirements of the application containers. Here, application containers 410-411 have implemented a VPN configuration capable of tunneling data from application 430 to application 431. A VPN tunnel allows traffic to be encrypted from application container 410, and transferred via an anonymous IP address to application container 411. Accordingly, tunneling may provide two levels of security. The first is that all data that is transmitted across the tunnel may be encrypted and can only be decrypted by the security layer at the other end of the tunnel. Second, by providing an anonymous IP address the destination of the data may be kept secure from malicious or unwanted machines or persons.

As illustrated in FIG. 4, data object 440 is to be transferred from application 430 to be received by application 431. Rather than changing the code of the application within container, security layer 420 allows data being transferred from or received by the application container to be modified, redirected, or reformatted without modifying the processes within the application. Accordingly, when data object 440 is to be transferred to application 431, the VPN configuration in security layer 420 transparently identifies the destination application or application container, encapsulates data object 440 within one or more packets to be delivered to application container 411, and transfers the packets using an anonymous VPN tunnel.

Once the data packets arrive at application container 411, security layer 421 de-encapsulates data object 440 from the data packets, and provides the object to application 431. Thus, although applications 430-431 are not modified when they are placed within the container, the data communications between the two applications may be encrypted and made anonymous using the VPN connection provided by the management service.

Figure 5:
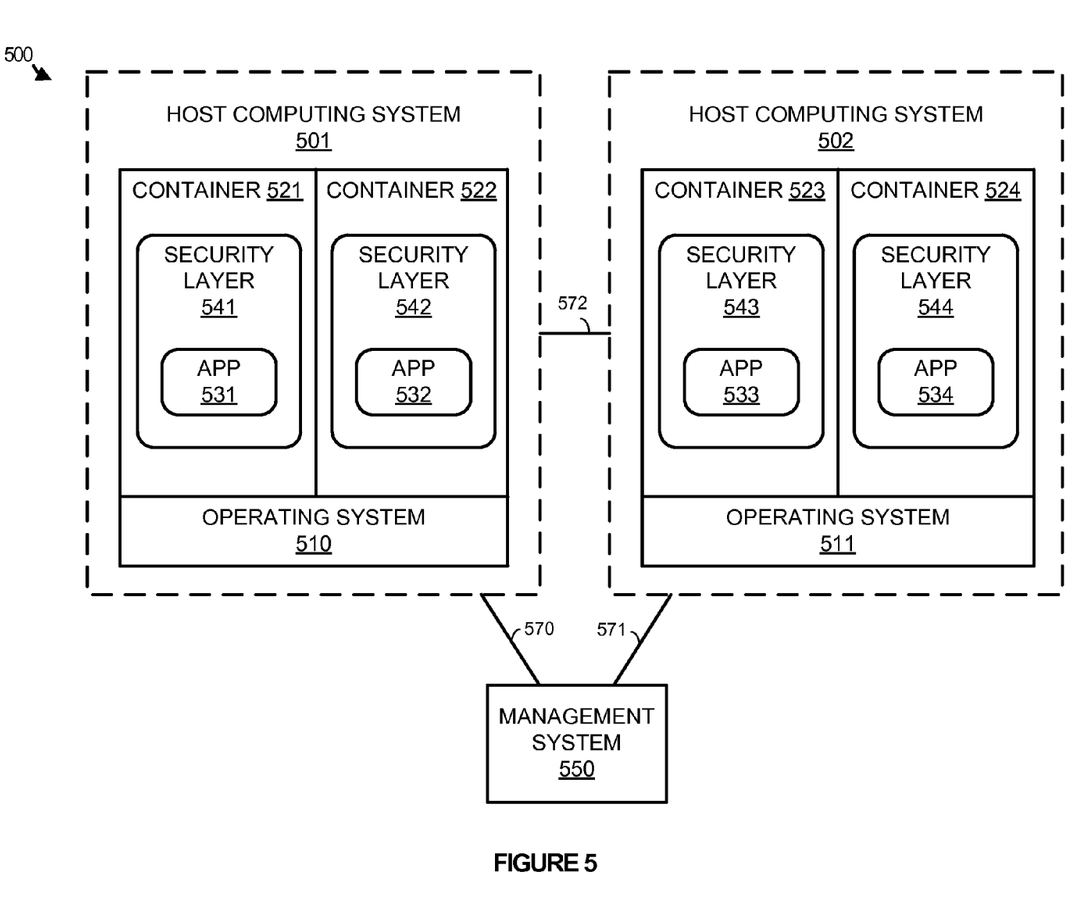
FIG. 5 illustrates an application container environment.

Turning to FIG. 5, FIG. 5 illustrates an application container environment 500. Application environment 500 includes host computing systems 501-502 and management system 550. Host computing systems 501-502 further include operating systems 510-511, and application containers 521-524. Application containers 521-524 further includes applications 521-534 and security layers 541-544. Management system communicates with host computing systems 501-502 over communication links 570-571. Host computing system 501 communicates with host computing system 502 over communication link 572.

In operation, application containers 521-524 are initiated on host computing systems 501-502 to perform specific tasks. In particular, each of application containers 521-524 includes a distinct application, and a security layer to act as an intermediary for data communications between the application, and processes, computing systems, and storage systems external to the application. In some examples, security layers 541-544 may include VPN modules to implement VPN tunneling between application containers and other systems.

As illustrated in the present example, host computing system 501-502 are communicatively coupled to management system 550. Management system 550 identifies application containers for secure communication, and identifies a VPN configuration for the application containers. This VPN configuration may be based on the applications within the containers, the type of data that is communicated between the two containers, specifications provided by an administrator, or any other security reason for communication between the application containers. Once the VPN configuration is identified, the configuration is then passed to the appropriate application containers to be implemented.

As an illustrated example, application containers 521 may require a secure communication path to communicate with application container 522. Accordingly, management system 550 will identify this requirement, identify a VPN tunneling configuration for the two application containers, and transfer the configuration to the application containers. Once received, security layers 541-542 may implement the VPN configuration and use the configuration to communicate data between the two application containers. Thus, although each application container 521-522 may include a public IP address that is used for communication with other containers, an anonymous IP address may be used to tunnel communications between the particular containers. For instance, if application 531 attempted to send a data object to application 532, security layer 541 may identify the destination for the data object, encrypt the data object using the VPN configuration from management system 550, and transfer the data to container 522 using the VPN configuration. Again, using the configuration from management system 550, security layer 542 may be used to receive the data object, and provide the object to application 532.

Referring to elements of application container environment 500, host computing system 501-502 and management system 550 may comprise any device or system of devices capable of operating as described herein. Host computing systems 501-502 and management system 550 may each comprise processing systems, storage systems, communication interfaces, user interfaces, power supplies, or any other computer related system. Although illustrated as separate in the present example, it should be understood that management system 550 might reside wholly or partially on host computing systems 501-502.

Communication links 570-572 each use metal, glass, optical, air, space, or some other material as the transport media. Communication links 570-572 may use Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Communication links 570-572 may each be a direct link, or can include intermediate networks, systems, or devices, and can include a logical network link transported over multiple physical links.

Figure 6:
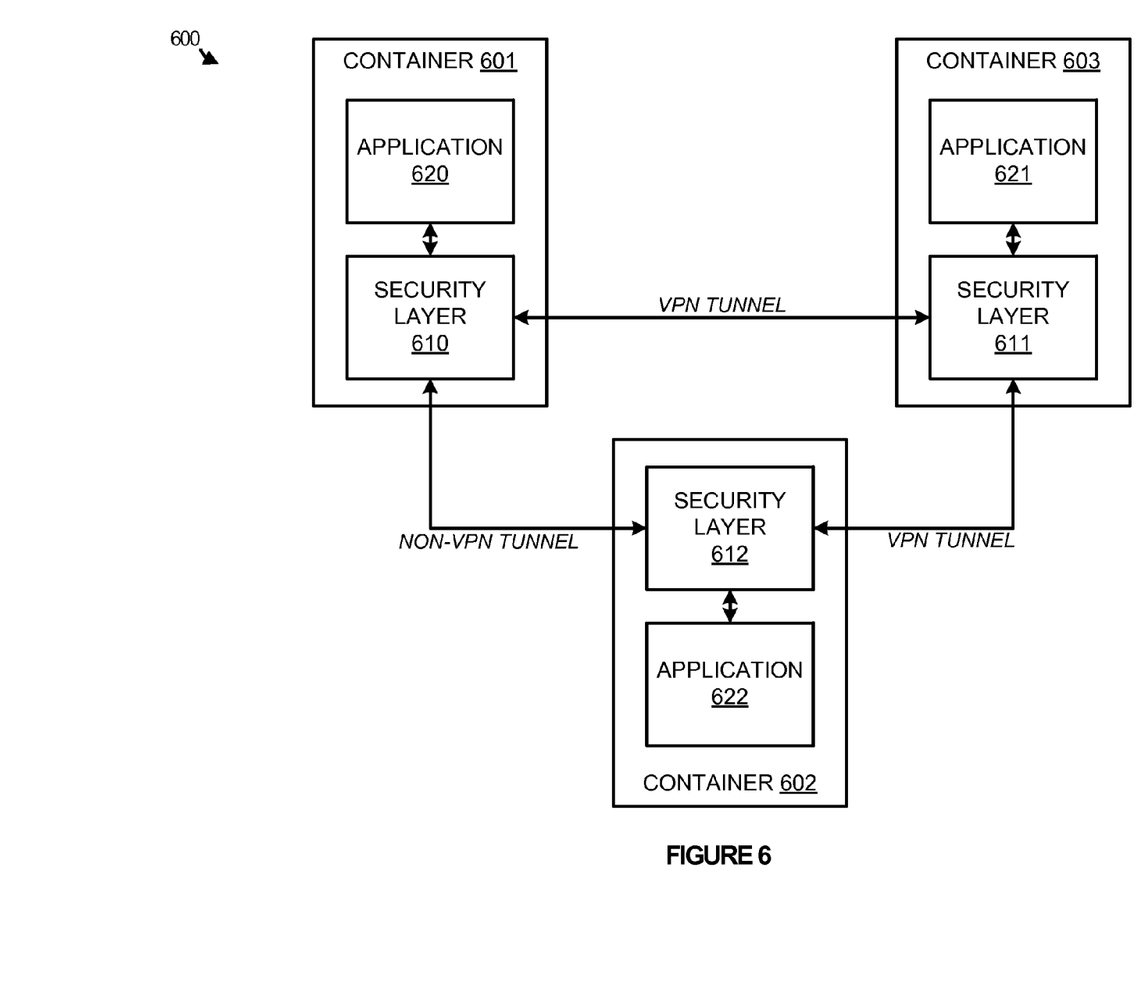
FIG. 6 illustrates an overview of data communications between application containers.

Turning to FIG. 6, FIG. 6 illustrates an overview 600 of data communications between application containers. Overview 600 includes application containers 601-603, which further include security layers 610-612 and applications 620-622. When deployed within one or more host computing systems security layers 610-612 are configured to act as communication intermediaries between applications 620-621 and external processes, computing systems and data systems.

As illustrated in FIG. 6, security layers 610-612 may be configured based on the requirements for the application environment. For example, if application 620 comprised a front-end server application, security layer 610 may be configured based on the requirements for this application. Similarly, if application 621 comprised a back-end data processing application, security layer 611 may be configured based on the requirements for application 621. In some examples, application containers 601-603 may be configured to communicate with a management system to retrieve configuration parameters for security layers 610-612. Accordingly, when the application containers are initiated on a host computing system, the containers may query the management system for at least a VPN tunneling configuration. The VPN configuration that is returned to each of the application containers may be based on the type of application for the container, the type of data handled by the application, may be assigned by an administrator, or may be determined by any other similar means.

As illustrated in the present example, two VPN tunnels are configured between application container 601 and application container 603, and between application containers 602 and application container 603. As a result of this configuration, when data needs to be transferred between application container 601 and application container 603, the data will be sent using the VPN tunnel rather than addressing the application container directly. This VPN tunnel may allow two application containers to pass data using anonymous IP addresses, encrypt the data passed between the application containers, or provide other similar security measures for the data. Accordingly, sensitive data that is transferred between the two applications may be more secure than using the standard IP communication path for the containers.

In some examples, such as illustrated with application container 603, more than one VPN tunnel may be applied via the VPN configurations. Accordingly, any data that is transferred by container 601 to container 603 may be processed using a first VPN tunnel configuration between the two container endpoints, whereas a second VPN tunnel configuration may be used to communicate data between application container 602 and application container 603. For example, if application container 603 comprised a database server, tunnels may be created between each of the applications that require access to the data accessible by application 621. Accordingly, when data objects are required for application 620 and application 622, the data may be transferred to the corresponding application and container using the appropriate VPN configuration for the application container.

In addition to the tunnels for communications, in some examples, application containers may directly address one another using the public IP address assigned to each of the application containers. Thus, some data communications from an application container may be configured to pass through secure tunnels, where as other data communications may pass through less secure links.

Figure 7:
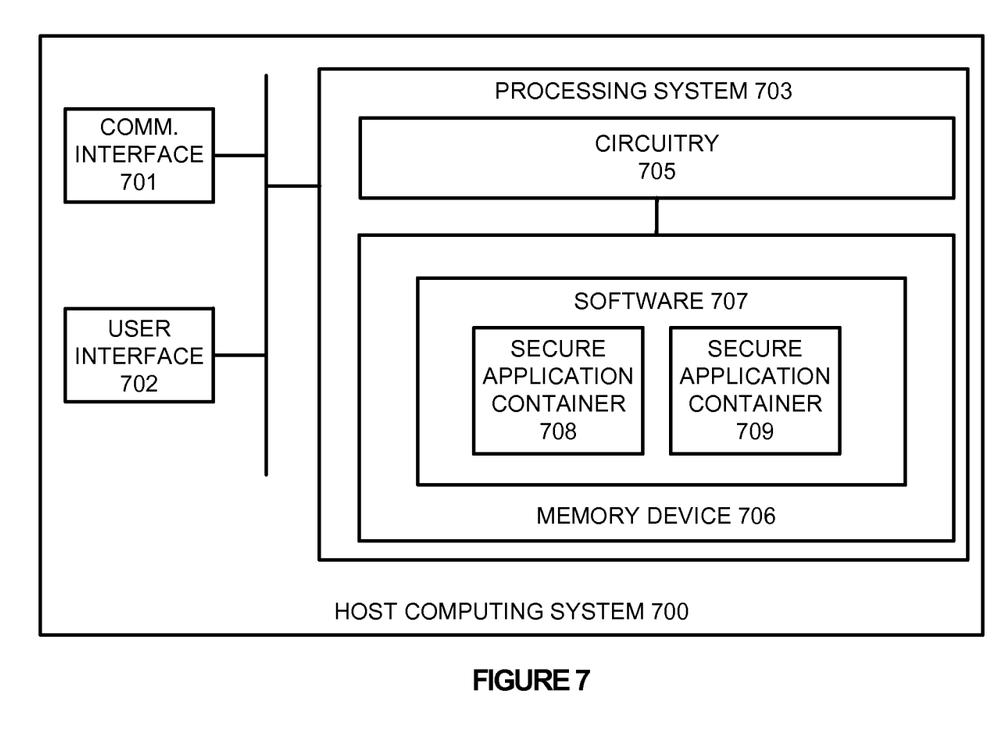
FIG. 7 illustrates a host computing system to provide a platform for secure application containers.

FIG. 7 illustrates a host computing system 700 to provide a platform for secure application containers. Host computing system 700 is representative of a computing system that may be employed in any computing apparatus, system, or device, or collections thereof, to suitably implement the host computing systems described herein capable of providing a platform for secure application containers. Computing system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, Internet Protocol (IP), Ethernet, optical networking, wireless protocols, communication signaling, or some other communication format—including combinations thereof. In some examples, communication interface 701 may be configured to communicate with a management system or apparatus to configure application containers for tunneled VPN communication.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes secure application containers 708-709, which each includes one or more applications and a security layer. Operating software 707 may further include an operating system, utilities, drivers, network interfaces, applications, or some other type of software. When executed by circuitry 705, operating software 707 directs processing system 703 to operate host computing system 700 as described herein.

In particular, host computing system 700 comprises software and other processing elements capable of providing a platform for secure application containers 708-709. Application containers 708-709 include an application specified by an administrator or some other management process, and further include a security layer that may act as an intermediary between the containerized application, and processes or data storage external to the application container. Specifically, the application containers rely on the operating system kernel functionality to provide resource isolation for the host computing elements, such as the processing unit, memory, block input/output, network, and other similar elements. Accordingly, the security layer and the application may execute without acknowledging other processes on the same host computing system. Each application container may comprise a Linux container, a jail, a partition, or other type of containment module, but may also comprise a virtual machine in some examples.

Here, the security layer within each of the application containers may be configured with a VPN configuration from a management system. This configuration may occur when the application containers are provisioned, or when the containers are initiated on the host computing system. This VPN configuration allows the application container to communicate sensitive data to other application containers and systems using a tunnel that provides security to communications communicated across the tunnel. For example, application container 708 may be configured to communicate highly sensitive information with application container 709. Accordingly, the management system may configure the application containers to communicate using a VPN tunnel. The VPN tunnel allows a private communication path to be established between the two communicating application containers.

Figure 8:
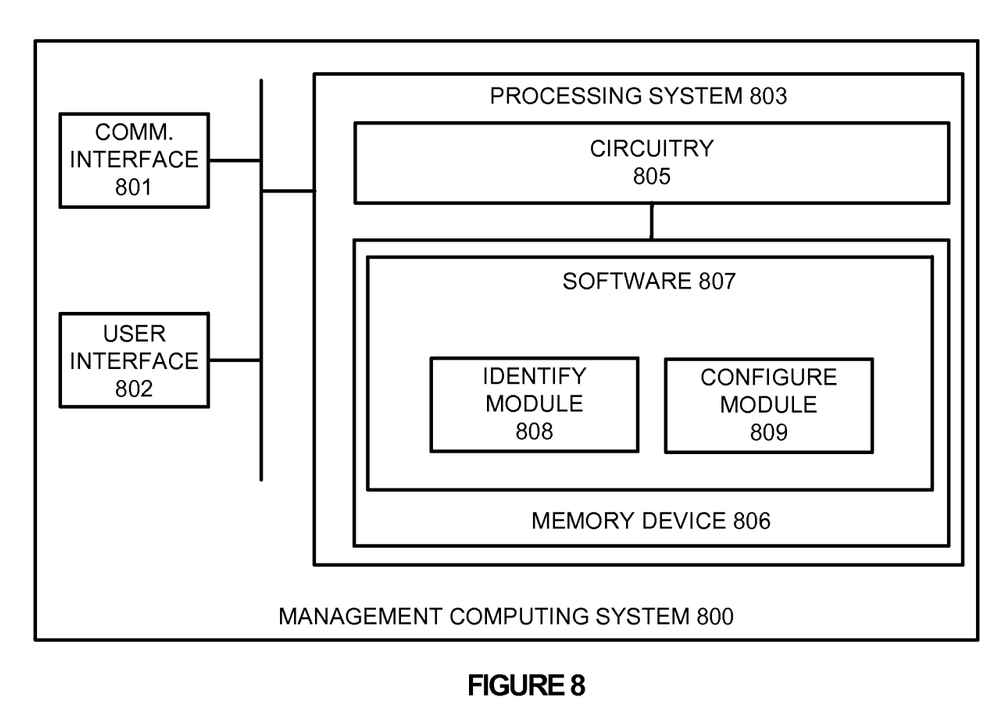
FIG. 8 illustrates a management computing system to provide encryption configurations to secure application containers.

FIG. 8 illustrates a management computing system 800 to provide encryption configurations to secure application containers. Management computing system 800 is representative of a computing system that may be employed in any computing apparatus, system, or device, or collections thereof, to suitably implement the management systems described herein capable of identifying and transferring VPN configurations to application containers. Computing system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, Internet Protocol (IP), Ethernet, optical networking, wireless protocols, communication signaling, or some other communication format—including combinations thereof. In some examples, communication interface 801 is configured to communicate with one or more host computing devices to provide the VPN configurations to application containers operating thereon.

User interface 802 comprises components that interact with a user. User interface 802 may include a keyboard, display screen, mouse, touch pad, or some other user input/output apparatus. User interface 802 may be omitted in some examples. In some examples, user interface 802 is configured to receive user specifications or preferences regarding VPN configurations for the application containers. In particular, the user may specify the particular application containers, the VPN configuration, or any other related information to VPN configuration.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes identify module 808 and configure module 809, although any number of software modules may provide the same functionality. Operating software 807 may further include an operating system, utilities, drivers, network interfaces, applications, or some other type of software. When executed by circuitry 805, operating software 807 directs processing system 803 to operate management computing system 800 as described herein.

In particular, identify module 808 is configured to, when executed by computing system 800, identify two application containers in an application container environment for secure communication. In some examples, these containers may be identified when the containers are provisioned. Thus, as soon as the application container is generated it may include the appropriate VPN configuration. In other instances, the application containers may be identified when the containers are instantiated on one or more hosts in the environment. Accordingly, when instantiated, a module within each of the application containers may contact management computing system 800, wherein management system 800 will then identify the application containers necessary for secure communication.

Once the containers are identified, identify module 808 identifies a VPN configuration for the two application containers. In response to identifying the configuration, configure module 809, configures the two application containers for secure communication by transferring the VPN configuration to security layers within each of the two application containers. As described above, in some examples, this transfer may occur when the application containers are being provisioned. However, in other instances, the VPN configuration may be provided to the application container when the container is initiated on a host computing system.

By transferring the VPN configurations to the application containers, a security module within each of the application containers is allowed to implement the configuration. Accordingly, the security layer may act as a transparent intermediary between the containerized application, and processes and storage systems external to the application container. Specifically, by implementing the VPN configuration, any data that is passed between the two identified applications in separate containers may be transferred using a tunnel that provides security and a peer-to-peer path between the containers.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a management system to provide virtual private network (VPN) configurations to application containers in an application container environment, the method comprising:
   identifying a first application container and a second application container in the application container environment for secure communication;
   identifying a VPN configuration for the first application container and the second application container; and
   configuring the first application container and the second application container for secure communication by transferring the VPN configuration to a first security layer within the first application container and a second security layer within the second application container,
   wherein the first security layer acts as a communication intermediary between at least one application within the first application container and at least one process or system external to the first application container, and
   wherein the second security layer acts as a communication intermediary between at least one application within the second application container and at least one process or system external to the second application container.

2. The method of claim 1 wherein the application container environment comprises a web service environment configured to provide a web service to one or more end user devices.

3. The method of claim 1 wherein identifying the first application container and the second application container in the application container environment for secure communication comprises:
   receiving a configuration request from at least one of the first application container or the second application container; and
   in response to receiving the configuration request, identifying the first application container and the second application container in the application container environment for secure communication.

4. The method of claim 1 wherein identifying the first application container and the second application container in the application container environment for secure communication comprises identifying user input defining the first application container and the second application container in the application container environment for secure communication.

5. The method of claim 1 wherein identifying the first application container and the second application container in the application container environment for secure communication comprises identifying applications within the first application container and the second application container for secure communication.

6. The method of claim 1 wherein the VPN configuration comprises a VPN tunnel configuration for communication between the first application container and the second application container.

7. The method of claim 1 wherein configuring the first application container and the second application container for secure communication by transferring the VPN configuration to the first security layer within the first application container and the second security layer within the second application container comprises configuring the first application container and the second application container for secure communication by provisioning the first application container and the second application container with the VPN configuration for the first security layer within the first application container and the second security layer within the second application container.

8. The method of claim 1 wherein identifying the VPN configuration for the first application container and the second application container comprises identifying the VPN configuration for the first application container and the second application container based on user defined preferences.

9. The method of claim 1 wherein identifying the VPN configuration for the first application container and the second application container comprises identifying the VPN configuration for the first application container and the second application container based on security requirements for the at least one application within the first application container and the at least one application within the second application container.

10. A computer apparatus to provide virtual private network (VPN) configurations to application containers in an application container environment, the computer apparatus comprising:
  processing instructions that direct a management system, when executed by the management system, to:
    identify a first application container and a second application container in the application container environment for secure communication;
    identify a VPN configuration for the first application container and the second application container; and
    configure the first application container and the second application container for secure communication by transferring the VPN configuration to a first security layer within the first application container and a second security layer within the second application container, wherein the first security layer acts as a communication intermediary between at least one application within the first application container and at least one process or system external to the first application container, and wherein the second security layer acts as a communication intermediary between at least one application within the second application container and at least one process or system external to the second application container; and
  one or more non-transitory computer readable media that store the processing instructions.

11. The computer apparatus of claim 10 wherein the application container environment comprises a web service environment configured to provide a web service to one or more end user devices.

12. The computer apparatus of claim 10 wherein the processing instructions to identify the first application container and the second application container in the application container environment for secure communication direct the management system to:
  receive a configuration request from at least one of the first application container or the second application container; and
  in response to receiving the configuration request, identify the first application container and the second application container in the application container environment for secure communication.

13. The computer apparatus of claim 10 wherein the processing instructions to identify the first application container and the second application container in the application container environment for secure communication direct the management system to identify user input defining the first application container and the second application container in the application container environment for secure communication.

14. The computer apparatus of claim 10 wherein the processing instructions to identify the first application container and the second application container in the application container environment for secure communication direct the management system to identify applications within the first application container and the second application container for secure communication.

15. The computer apparatus of claim 10 wherein the VPN configuration comprises a VPN tunnel configuration for communication between the first application container and the second application container.

16. The computer apparatus of claim 10 wherein the processing instructions to configure the first application container and the second application container for secure communication by transferring the VPN configuration to the first security layer within the first application container and the second security layer within the second application container direct the management system to configure the first application container and the second application container for secure communication by provisioning the first application container and the second application container with the VPN configuration for the first security layer within the first application container and the second security layer within the second application container.

17. The computer apparatus of claim 10 wherein the processing instructions to identify the VPN configuration for the first application container and the second application container direct the management system to identify the VPN configuration for the first application container and the second application container based on user defined preferences.

18. The computer apparatus of claim 10 wherein the processing instructions to identify the VPN configuration for the first application container and the second application container direct the management system to identify the VPN configuration for the first application container and the second application container based on security requirements for the at least one application within the first application container and the at least one application within the second application container.

* * * * *